United States Patent
Seidl et al.

(10) Patent No.: US 10,576,779 B2
(45) Date of Patent: Mar. 3, 2020

(54) VEHICLE RIM AND VEHICLE WHEEL HAVING A VEHICLE RIM

(71) Applicant: Bayerische Motoren Werke Aktiengesellschaft, Munich (DE)

(72) Inventors: Josef Seidl, Dingolfing (DE); Stephan Fischer, Puchheim (DE); Achim Gordner, Grossberghofen (DE); Elmar Jaeger, Kempten im Allgaeu (DE); Paul Summerer, Attenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 270 days.

(21) Appl. No.: 15/681,997

(22) Filed: Aug. 21, 2017

(65) Prior Publication Data

US 2017/0341466 A1 Nov. 30, 2017

Related U.S. Application Data

(63) Continuation of application No. PCT/EP2016/057896, filed on Apr. 11, 2016.

(30) Foreign Application Priority Data

May 4, 2015 (DE) .................. 10 2015 208 187

(51) Int. Cl.
*B60B 21/02* (2006.01)
*B60K 1/04* (2019.01)
(Continued)

(52) U.S. Cl.
CPC .............. *B60B 21/02* (2013.01); *B60B 5/02* (2013.01); *B60B 21/12* (2013.01); *B60K 1/04* (2013.01);
(Continued)

(58) Field of Classification Search
CPC .......... B60B 21/02; B60B 21/12; B60B 5/02; B60K 1/04; B62J 6/20; B60Q 1/326
(Continued)

(56) References Cited

U.S. PATENT DOCUMENTS 4,148,008 A * 4/1979 Lusk .................. B60C 23/0428
  200/61.25
4,409,586 A * 10/1983 Hochstein .......... B60C 23/0428
  340/448
(Continued)

FOREIGN PATENT DOCUMENTS

| CN | 103660914 A | 3/2014 |
| CN | 103821847 A | 5/2014 |

(Continued)

OTHER PUBLICATIONS

English translation of Chinese-language Office Action issued in counterpart Chinese Application No. 201680004634.1 dated Oct. 8, 2018 (nine (9) pages).

(Continued)

*Primary Examiner* — Kip T Kotter
(74) *Attorney, Agent, or Firm* — Crowell & Moring LLP

(57) ABSTRACT

A vehicle rim is provided having a rim body and at least one capacitor. The rim body has a hub region, a rim bed and a connection region that connects the hub region to the rim bed. The rim body forms at least a part of a housing of the capacitor.

15 Claims, 2 Drawing Sheets

(51) Int. Cl.
*B60B 5/02* (2006.01)
*B60B 21/12* (2006.01)

(52) U.S. Cl.
CPC ..... *B60K 2001/045* (2013.01); *B60Y 2200/12* (2013.01)

(58) Field of Classification Search
USPC .................................................. 301/95.107
See application file for complete search history.

(56) References Cited

U.S. PATENT DOCUMENTS

| | | | |
|---|---|---|---|
| 4,737,761 A | | 4/1988 | Dosjoub et al. |
| 5,163,320 A * | | 11/1992 | Goshima ............. B60C 23/0428 301/64.701 |
| 5,531,109 A | | 7/1996 | Tsagas |
| 6,357,833 B1 | | 3/2002 | Bajer |
| 7,034,672 B2 * | | 4/2006 | Dinello ................... B29C 41/18 340/442 |
| 2004/0007302 A1 * | | 1/2004 | Hamilton ................ B60C 23/12 152/416 |
| 2004/0066288 A1 * | | 4/2004 | Okumura ............ B60C 23/0408 340/445 |
| 2004/0261510 A1 * | | 12/2004 | Schulze .............. B60C 23/0408 73/146 |
| 2005/0156538 A1 * | | 7/2005 | Wang ..................... B60Q 1/326 315/292 |
| 2006/0098389 A1 * | | 5/2006 | Liu ......................... B82Y 10/00 361/502 |
| 2007/0058385 A1 * | | 3/2007 | Chen ..................... B60Q 1/326 362/500 |
| 2014/0191566 A1 * | | 7/2014 | Burlefinger ............... B60B 5/02 301/95.103 |

FOREIGN PATENT DOCUMENTS

| | | |
|---|---|---|
| DE | 1 505 880 A1 | 7/1970 |
| DE | 10 2014 001 850 A1 | 8/2015 |
| EP | 2 423 094 A2 | 2/2012 |
| FR | 2 890 897 A3 | 3/2007 |
| GB | 1 153 900 A | 5/1969 |
| GB | 2 122 757 A | 1/1984 |
| JP | 2009-173054 A | 8/2009 |
| JP | 2010-95165 A | 4/2010 |
| WO | WO 2014/044237 A1 | 3/2014 |

OTHER PUBLICATIONS

International Search Report (PCT/ISA/210) issued in PCT Application No. PCT/EP2016/057896 dated Jul. 14, 2016 with English translation (Four (4) pages).
German-language Written Opinion (PCT/ISA/237) issued in PCT Application No. PCT/EP2016/057896 dated Jul. 14, 2016 (Five (5) pages).
German-language Search Report issued in counterpart German Application No. 10 2015 208 187.7 dated Feb. 5, 2016 with partial English translation (Ten (10) pages).

* cited by examiner

VEHICLE RIM AND VEHICLE WHEEL HAVING A VEHICLE RIM

CROSS REFERENCE TO RELATED APPLICATIONS

This application is a continuation of PCT International Application No. PCT/EP2016/057896, filed Apr. 11, 2016, which claims priority under 35 U.S.C. § 119 from German Patent Application No. 10 2015 208 187.7, filed May 4, 2015, the entire disclosures of which are herein expressly incorporated by reference.

BACKGROUND AND SUMMARY OF THE INVENTION

The invention relates to a vehicle rim. The vehicle rim may, for example, be a motorcycle rim. Furthermore, the invention relates to a vehicle wheel which has a vehicle rim.

So-called supercapacitors, which are also referred to as supercaps or ultracapacitors, are used in various manners in vehicles of all types. In the prior art the supercapacitors are in this instance installed in vehicles as separate components which have a housing and capacitor elements, such as capacitor electrodes.

As a result of the capacitors which are constructed as separate components, a specific minimum structural space is required in the vehicle for the installation thereof. Furthermore, as a result of the installation, the weight of the vehicles is increased.

It is an objective of at least a number of embodiments to provide a vehicle rim which has at least one capacitor, wherein the required structural space and weight can be reduced.

A vehicle rim according to at least one embodiment of the invention has a rim body and at least one capacitor. Preferably, the capacitor is integrated in the vehicle rim. The rim body preferably has a hub region, a rim bed and a connection region. The connection region connects the hub region to the rim bed. For example, the connection region may include one or more spokes. Furthermore, the connection region may, for example, be constructed as a disk.

According to a particularly preferred embodiment, the rim body forms at least a portion of a housing of the capacitor. For example, the capacitor may have capacitor elements which can be embedded at least partially in a recess of the rim body. The capacitor elements may, for example, be capacitor electrodes of the capacitor. The capacitor elements may, for example, be embedded inside the recess of the rim body in a casting compound.

According to another embodiment, the capacitor is arranged in the vehicle rim so as to surround the hub region. For example, the recess of the rim body in which the capacitor elements of the capacitor can be arranged may extend completely around the hub region. Preferably, the capacitor elements of the capacitor are embedded in a recess of the rim body in such a manner that they extend completely around the hub region.

According to another embodiment, the rim body is constructed in an integral manner. That is to say, the rim body which may have or include the hub region, the connection region and the rim bed may be produced in one piece.

According to another embodiment, the rim body has a composite fiber material or includes a composite fiber material. For example, the rim body may have or include a carbon-fiber-reinforced plastics material. The rim body may, for example, be wound with a CFRP construction method.

According to another embodiment, the capacitor has capacitor elements which are embedded in the rim bed. Preferably, the capacitor elements of the capacitor are arranged in the rim bed so as to surround the hub region.

According to another embodiment, the capacitor elements of the capacitor are wound. The capacitor may, for example, be a so-called wound capacitor. For example, the capacitor elements may be wound on the rim body in such a manner that they surround the hub region in a state arranged on the rim bed or embedded in a recess of the rim bed.

According to another embodiment, the capacitor elements of the capacitor are present in stacked form. For example, the capacitor may be a disk capacitor or multi-layer capacitor.

According to another embodiment, the capacitor elements of the capacitor are embedded in a recess of the connection region. For example, the connection region may be constructed as a disk, wherein the disk has at least one recess in which the capacitor elements are at least partially embedded. The capacitor elements may, for example, be constructed in a disk-like manner with a central recess and be arranged in the recess so as to surround the hub region.

According to another embodiment, the vehicle rim has at least one additional capacitor. The additional capacitor may have capacitor elements which may be embedded at least partially in an additional recess, for example, an additional recess of the connection region.

According to another embodiment, the capacitor is a supercapacitor. For example, the supercapacitor may have a capacitance of at least 1 F. Preferably, the supercapacitor has a capacitance of at least 100 F. The supercapacitor may, for example, be in the form of a wound supercapacitor with wound electrodes or, for example, a supercapacitor with stacked electrodes. With an embodiment having a plurality of capacitors, all the capacitors may be supercapacitors.

According to another embodiment, the capacitor or the capacitors is/are connected by way of slip rings and/or in an inductive manner to an on-board network of a vehicle.

With the vehicle rim according to the invention, in which a capacitor is integrated in the vehicle rim, the required structural space, the vehicle weight and the costs during production can advantageously be reduced in comparison with the prior art.

Furthermore, according to the invention, a vehicle wheel which has a vehicle rim is described. The vehicle wheel may, for example, be a vehicle wheel for a motorcycle. The vehicle wheel preferably further has a vehicle tire. Preferably, the capacitor or the capacitor elements of the capacitor is/are arranged between the rim body and the vehicle tire.

According to another embodiment, the vehicle wheel has a wheel hub motor which is supplied by the capacitor or the capacitors. The wheel hub motor may, for example, include an inverter which may be connected, for example, by way of connection elements, to the capacitor or the capacitors. Signals for motor control may be transmitted, for example, by way of slip rings and/or in an inductive manner to the inverter. Furthermore, it is possible for the signals for motor control to be transmitted to the inverter by via radio.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
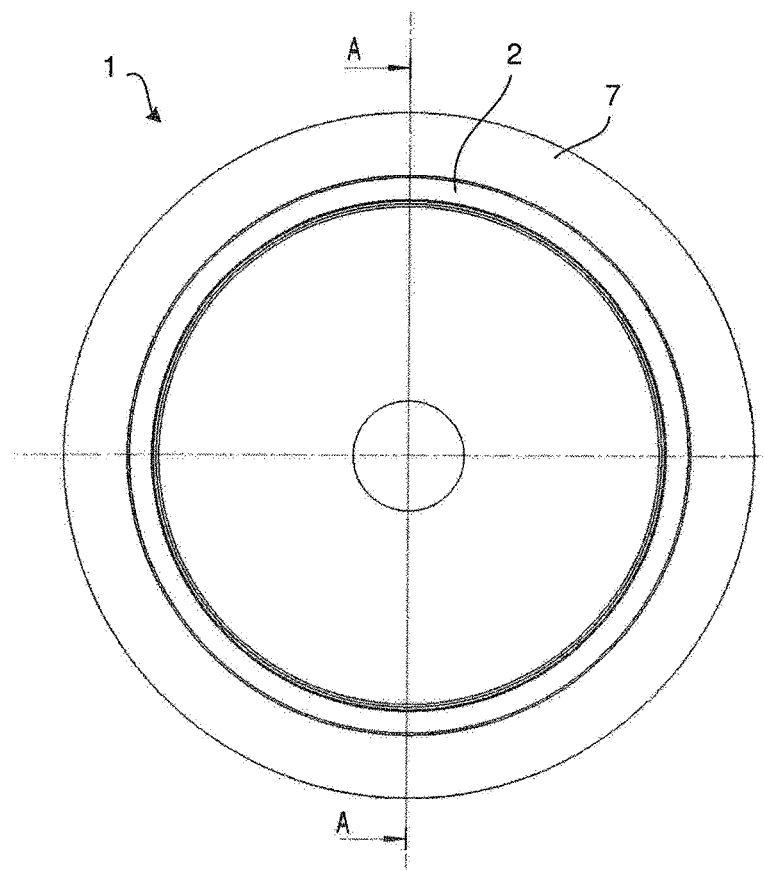
FIGS. 1A-1C are schematic illustrations of a vehicle wheel with a vehicle rim according to a first embodiment of the invention.

In the embodiments and figures, components which are the same or have the same effect are each given the same reference numerals. The elements which are illustrated and their size relationships with respect to each other are in principle not intended to be considered to be true to scale. Instead, individual elements for better illustration and/or for better understanding may be illustrated in an exaggeratedly thick manner or with large dimensions.

Figure 1B:
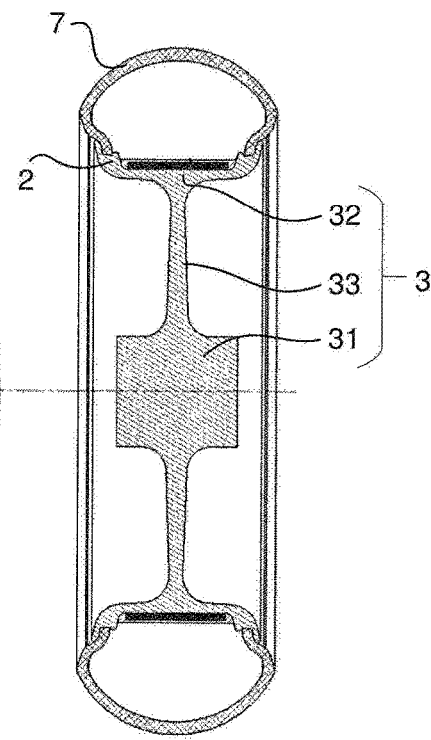
Figure 1C:
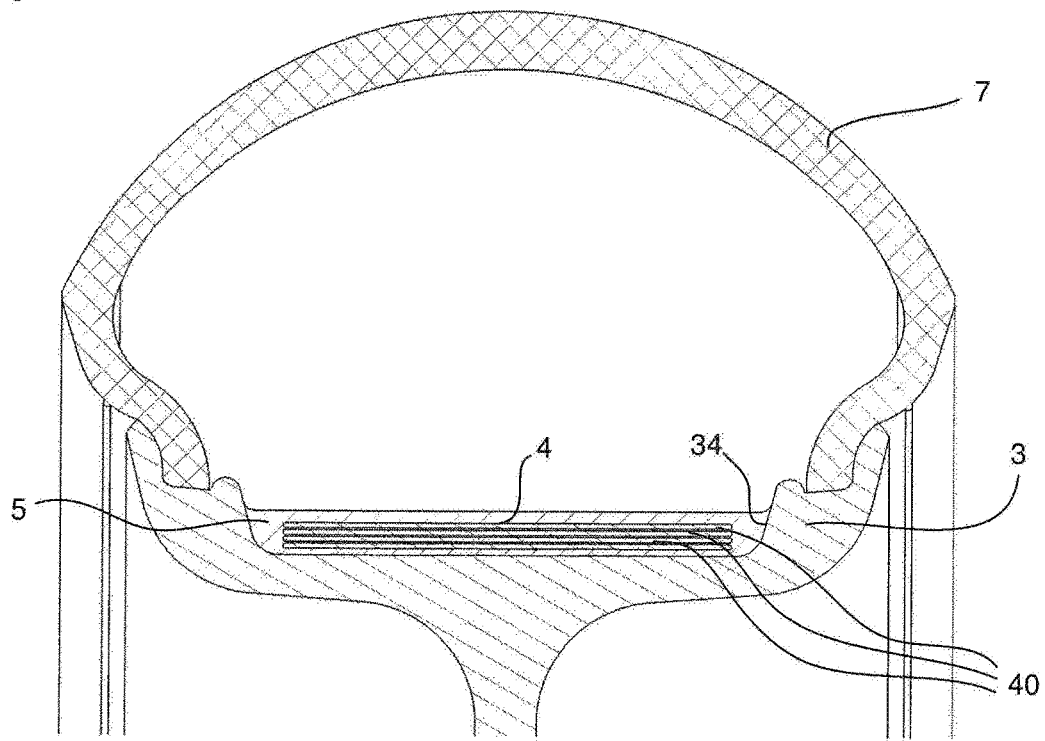

FIG. 1A is a schematic illustration of a vehicle wheel 1 which has a vehicle rim 2 and a vehicle tire 7. In FIG. 1B, the vehicle wheel 1 from FIG. 1A is shown as a sectioned view which is obtained by way of a section along the line A-A. FIG. 1C is an enlarged cut-out from FIG. 1B.

The vehicle rim 2 has a rim body 3 and a capacitor 4. The rim body 3 includes a hub region 31, a rim bed 32 and a connection region 33 which connects the hub region 31 to the rim bed 32 and which is constructed in the form of a spoke. The rim body 3 is constructed in an integral manner and comprises a carbon-fiber-reinforced plastics material. The capacitor 4 has a plurality of capacitor elements 40 which make up the capacitor electrodes. The capacitor elements 40 are arranged in a recess 34 of the rim bed 32. Furthermore, the capacitor elements 40 of the capacitor are embedded in a casting compound 5. The rim body 3 forms a portion of the housing of the capacitor 4.

The capacitor elements 40 of the capacitor 4 are wound onto the rim bed 32 and completely surround the hub region 31 of the rim body 3. The capacitor 4 is constructed as a supercapacitor and has a capacitance of at least 1 F.

Alternatively to the embodiment shown in FIGS. 1A to 1C, the recess 34 of the rim bed 32 may be provided with a cover. Consequently, the capacitor elements 40 and the casting compound 5 may be embedded in a hollow space formed by the recess 34 and the cover.

Figure 2A:
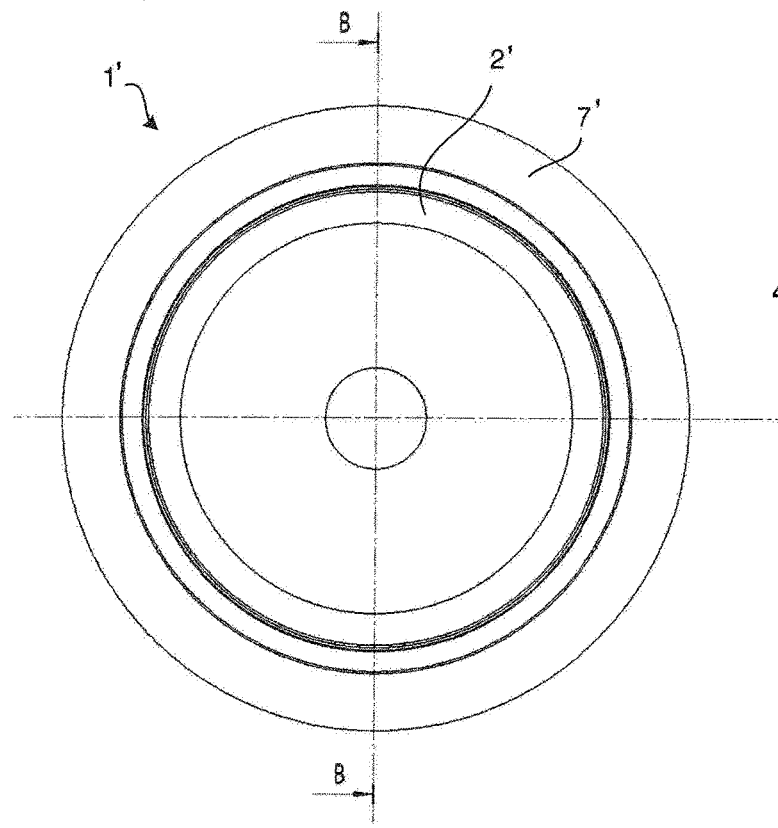
FIGS. 2A-2C are schematic illustrations of a vehicle wheel with a vehicle rim according to another embodiment of the invention.
Figure 2B:
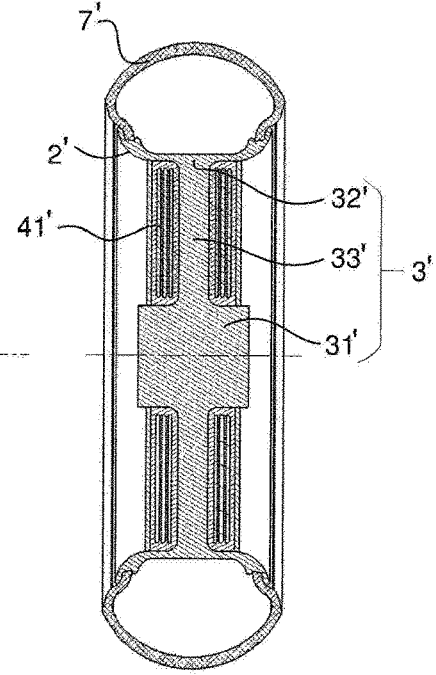
Figure 2C:
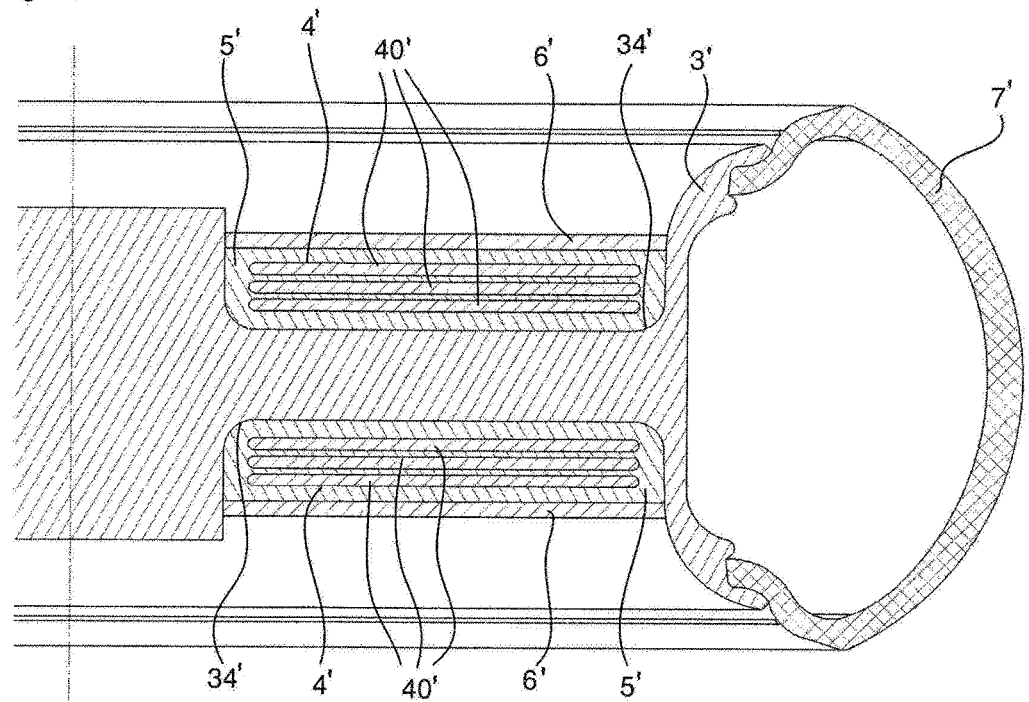

FIGS. 2A to 2C show a vehicle wheel 1' according to another embodiment. FIG. 2B is a sectioned view through the vehicle wheel 1' from FIG. 2A, wherein the sectioned view is obtained by way of a section along the line B-B from FIG. 2A. FIG. 2C is an enlarged cut-out from FIG. 2B.

The vehicle wheel 1' includes a vehicle tire 7' and a vehicle rim 2'. The vehicle rim has a rim body 3' and two capacitors 4'. The rim body 3' has a hub region 31', a rim bed 32' and a connection region 33' which connects the hub region 31' to the rim bed 32' and which is constructed as a disk. The rim body 3' is constructed in an integral manner in the embodiment shown and comprises a carbon-fiber-reinforced plastics material.

The capacitors 4' each have a plurality of capacitor elements 40' which make up the capacitor electrodes. The capacitor elements 40' of the capacitors 4' are each arranged in a recess 34' in the connection region 33' and are embedded in a casting compound 5'. The rim body 3' of the vehicle rim 2' forms a portion of the housing of the capacitors 4'. Furthermore, the recesses 34' in which the capacitor elements 40' are embedded with the casting compound 5' are each closed in an outward direction by a cover 6'.

The two recesses 34', in which the capacitor elements 40' of the capacitors 4' are embedded, are constructed at two opposing sides of the connection region 33'. The capacitor elements 40' are each constructed in the form of a disk with a recess at the center and are stacked one on the other.

Consequent e capacitor elements 40' completely surround the hub region 31' of the rim body 3'.

The capacitors 4 are so-called supercapacitors. For example, the supercapacitors may each have a capacitance of at least 1 F.

With the vehicle wheels which are illustrated here, a reduction of structural space, weight and costs can be achieved by means of the capacitors which are integrated in the vehicle rims.

LIST OF REFERENCE NUMERALS

1 Vehicle wheel
2 Vehicle rim
3 Rim body
3 Hub region
32 Rim bed
33 Connection region
34 Recess
4 Capacitor
40 Capacitor elements
5 Casting compound
6 Cover
7 Vehicle tire The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle rim, comprising:
    a rim body having a hub region, a rim bed and a connection region which connects the hub region to the rim bed;
    a casting compound; and
    at least one capacitor, wherein
        the rim body forms at least a portion of a housing of the capacitor, and
        the casting compound is disposed in the at least a portion of a housing of the capacitor formed by the rim body.

2. The vehicle rim as claimed in claim 1, wherein the capacitor has capacitor elements which are embedded in a recess of the rim body.

3. The vehicle rim as claimed in claim 2, wherein the capacitor is arranged in the vehicle rim so as to surround the hub region.

4. The vehicle rim as claimed in claim 1, wherein the capacitor is arranged in the vehicle rim so as to surround the hub region.

5. The vehicle rim as claimed in claim 1, wherein the rim body is constructed in an integral manner.

6. The vehicle rim as claimed in claim 1, wherein the rim body comprises a composite fiber material.

7. The vehicle rim as claimed in claim 1, wherein the rim body comprises a carbon-fiber-reinforced plastics material.

8. The vehicle rim as claimed in claim 1, wherein the capacitor has capacitor elements which are embedded in the rim bed so as to surround the hub region.

9. The vehicle rim as claimed in claim 1, wherein the capacitor has capacitor elements which are wound.

10. The vehicle rim as claimed in claim 1, wherein the capacitor has capacitor elements which are stacked.

11. The vehicle rim as claimed in claim 1, wherein the capacitor has capacitor elements which are embedded in a recess of the connection region.

12. The vehicle rim as claimed in claim 11, further comprising:
   at least one additional capacitor which has capacitor elements which are embedded in an additional recess of the connection region.

13. The vehicle rim as claimed in claim 1, wherein capacitor elements of the capacitor are at least partially surrounded by the casting compound.

14. The vehicle rim as claimed in claim 1, wherein the capacitor is a supercapacitor.

15. The vehicle rim as claimed in claim 1, further comprising a vehicle tire, wherein the capacitor is arranged between the rim body and the vehicle tire.

* * * * *